United States Patent
Ferrari et al.

(10) Patent No.: US 12,390,917 B2
(45) Date of Patent: Aug. 19, 2025

(54) WORK EQUIPMENT PROVIDED WITH A DAMPER ELEMENT

(71) Applicant: EMAK S.P.A., Bagnolo in Piano (IT)

(72) Inventors: Marco Ferrari, Carpi (IT); Lorenzo Castellari, Montecchio Emilia (IT); Andrea Catellani, Bagnolo in Piano (IT)

(73) Assignee: EMAK S.P.A., Bagnolo in Piano (IT)

( * ) Notice: Subject to any disclaimer, the term of this patent is extended or adjusted under 35 U.S.C. 154(b) by 345 days.

(21) Appl. No.: 17/428,352

(22) PCT Filed: Mar. 5, 2020

(86) PCT No.: PCT/IB2020/051905
§ 371 (c)(1),
(2) Date: Aug. 4, 2021

(87) PCT Pub. No.: WO2020/194086
PCT Pub. Date: Oct. 1, 2020

(65) Prior Publication Data
US 2022/0152808 A1    May 19, 2022

(30) Foreign Application Priority Data

Mar. 25, 2019   (IT) .................. 102019000004275

(51) Int. Cl.
*B25F 5/00*    (2006.01)
*A01D 34/416*   (2006.01)
*A01D 34/90*    (2006.01)

(52) U.S. Cl.
CPC ............ *B25F 5/006* (2013.01); *A01D 34/416* (2013.01); *A01D 34/905* (2013.01)

(58) Field of Classification Search
CPC .......... B25F 5/00; B25F 5/006; A01D 34/905; A01D 34/416
See application file for complete search history.

(56) References Cited

U.S. PATENT DOCUMENTS

| | | | | |
|---|---|---|---|---|
| 4,638,562 A * | 1/1987 | Drake | ................... | A01G 3/053 30/340 |
| 4,759,128 A * | 7/1988 | Katoh | .................. | A01D 34/905 30/276 |
| 4,819,742 A * | 4/1989 | Driggers | ................. | B25F 5/006 30/276 |
| 5,345,684 A * | 9/1994 | Shoup | .................. | A01D 34/416 248/610 |
| 6,745,475 B1 * | 6/2004 | Trumpf | ................ | A01D 34/902 30/340 |
| 2002/0004989 A1 | 1/2002 | Schweigert et al. | | |

(Continued)

FOREIGN PATENT DOCUMENTS

EP    1530890 A1    5/2005
GB    1066895 A     4/1967

*Primary Examiner* — Thomas M Wittenschlaeger
(74) *Attorney, Agent, or Firm* — Volpe Koenig

(57) ABSTRACT

A work equipment (10) is described comprising a pole (20) for supporting a work apparatus (W), wherein the work apparatus (W) comprises: a. a work tool (55), b. a motor (45) adapted to activate the work tool (55), c. a casing (60) rigidly fixed to one end of the pole (20), and adapted to contain the motor (45), characterized in that the work equipment (10) comprises a damper element (85) interposed between the casing (60) and the pole (20).

14 Claims, 3 Drawing Sheets

(56) References Cited

U.S. PATENT DOCUMENTS

| | | | | |
|---|---|---|---|---|
| 2008/0153401 A1* | 6/2008 | Wuensch | ............... | B24B 23/00 |
| | | | | 451/344 |
| 2011/0289721 A1* | 12/2011 | Allen | ..................... | B25F 5/006 |
| | | | | 15/344 |
| 2013/0185899 A1* | 7/2013 | Zhang | ................. | B25D 17/043 |
| | | | | 16/431 |
| 2015/0013172 A1* | 1/2015 | Shaffer | ............... | A01D 34/416 |
| | | | | 30/276 |
| 2016/0345492 A1* | 12/2016 | Miller | .................. | A01D 34/416 |
| 2018/0051472 A1* | 2/2018 | Grinwald | .............. | E04F 21/248 |
| 2019/0091848 A1* | 3/2019 | Walker | ..................... | B25F 5/00 |
| 2020/0032461 A1* | 1/2020 | Widlroither | ............ | B25C 11/00 |

* cited by examiner

WORK EQUIPMENT PROVIDED WITH A DAMPER ELEMENT

TECHNICAL FIELD

The present invention relates to work equipment and, in particular, portable battery-operated electrical work equipment like those that are commonly used to perform gardening jobs, including for example brushcutters, hedge trimmers and the like.

PRIOR ART

As is known, the work equipment mentioned above generally comprises a support pole for supporting a work apparatus fixed to an end of said pole.

Said work apparatus generally comprises an electric motor adapted to activate a work equipment, for example a cutting tool, through a transmission system.

The electric motor and the transmission means are normally housed inside a relevant casing, which is rigidly fixed without any residual degrees of freedom to the support pole so as to be able to be moved thereby, thus directing the work tool.

A known problem of said work equipment is that it is particularly subject to vibrations, generated in part by the misalignment between an output shaft of the motor and a rotation shaft of the tool, due to the presence of the transmission system; the vibrations are transmitted by the casing to the support pole and therefore through the support pole to the user of the work equipment.

An object of the present invention is to solve said disadvantage of the prior art.

It is a further object of the present invention to achieve such object within the scope of a simple, rational and affordable solution.

Such object is achieved by the features of the invention indicated in the independent claim. The dependent claims outline preferred and/or particularly advantageous aspects of the invention.

DISCLOSURE OF THE INVENTION

In particular, the invention makes available a work equipment comprising a pole for supporting a work apparatus, wherein the work apparatus comprises:
  a. a work tool,
  b. a motor adapted to activate the work tool,
  c. a casing rigidly fixed to an end of the pole, and adapted to contain the motor,
wherein the work equipment comprises a damper element interposed between the casing and the pole.

Thanks to such solution, the invention makes available a work equipment wherein the vibrations generated by the work apparatus are effectively dampened/absorbed before being transmitted through the pole.

Another aspect of the invention envisages that the damper element can be interposed between the casing and the pole along the whole circumferential extension of the pole. Thanks to this solution, the damper element is adapted to embrace the support pole of the work apparatus so as to be completely interposed between it and the casing, and therefore being notably effective in the damping/absorption of the vibrations generated by the work apparatus.

A further aspect of the invention envisages the damper element being able to be housed in a housing seat obtained in the casing of the work apparatus.

Thanks to this solution, the contact interface of the damper element with the casing is notably improved, making the vibration damping/absorption action more effective, within the context of a particularly simple and rational solution.

Another aspect of the invention envisages the casing of the work apparatus being able to have abutment teeth for the damper element, placed in pressure against it.

Thanks to such solution, the damper element effectively allows the vibrations transmitted by the motor unit/work tool assembly through the casing to be limited, as the casing is pressed against the damper element and is therefore notably limited in the oscillations.

At the same time this solution allows the damper element to be kept effectively in position, within the context of a particularly simple and effective solution.

Again, another aspect of the invention envisages that the damper element may comprise an annular body fitted onto the pole.

Thanks to this solution, the damper element comprises a body that can be easily and intuitively connected to the pole, and that is simple to produce.

Another aspect of the invention envisages the casing being able to comprise two shells fixed together through fixing elements.

Thanks to such solution, the casing is realised through a particularly simple and rational process, and the assembly of the various components of the work apparatus is quicker and simpler overall.

Another aspect of the invention envisages the damper element being able to be made of a copolymer of acrylonitrile and butadiene.

Thanks to such solution, the damper element is made of a material that is particularly suitable for the damping/absorption of vibrations, within the context of a rational and affordable solution.

BRIEF DESCRIPTION OF THE DRAWINGS

Further features and advantages of the invention will be more apparent after reading the following description provided by way of a non-limiting example, with the aid of the accompanying drawings.

BEST WAY TO ACTUATE THE INVENTION

Figure 1:
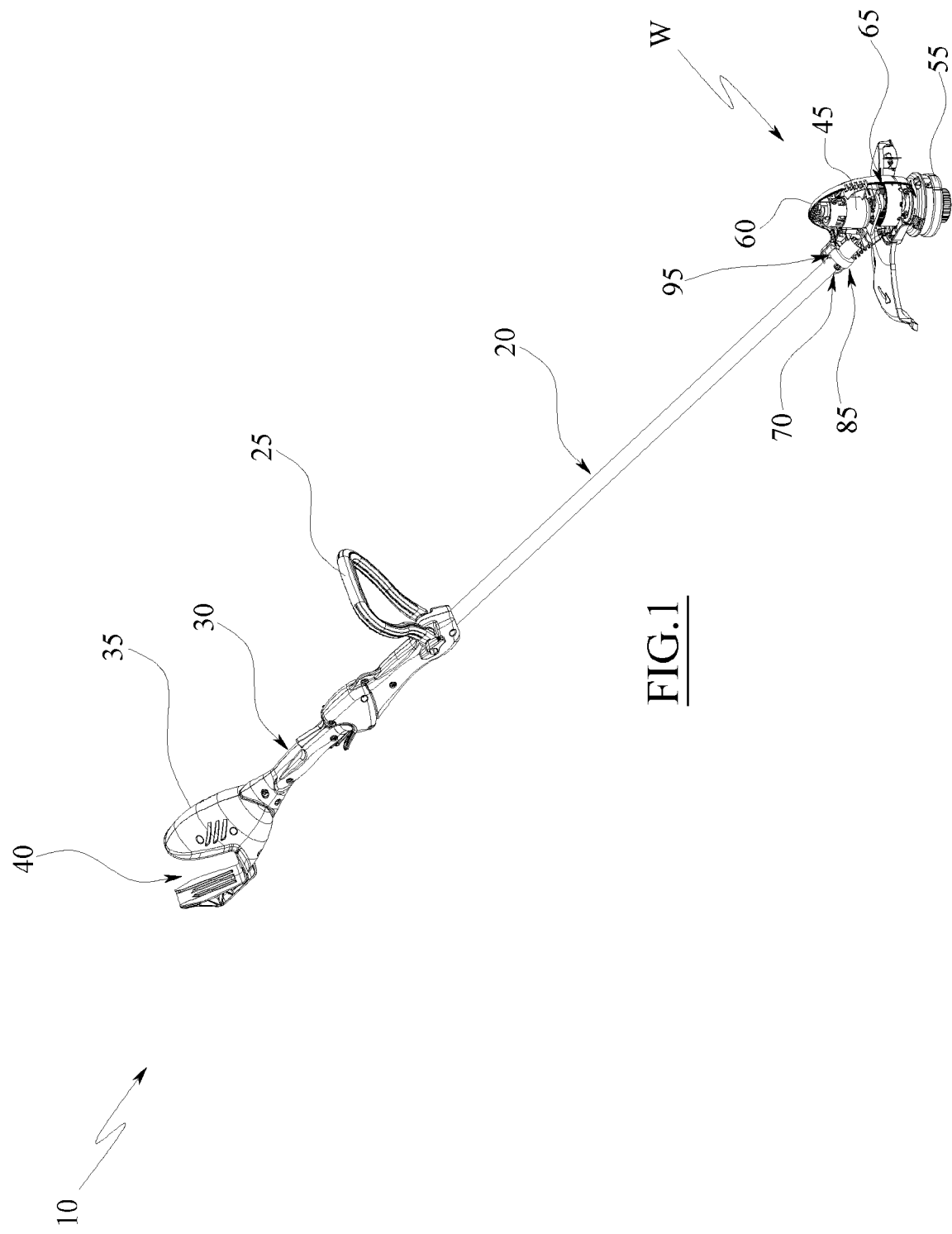
FIG. 1 is a perspective view of a work equipment according to an embodiment of the present invention.
Figure 2:
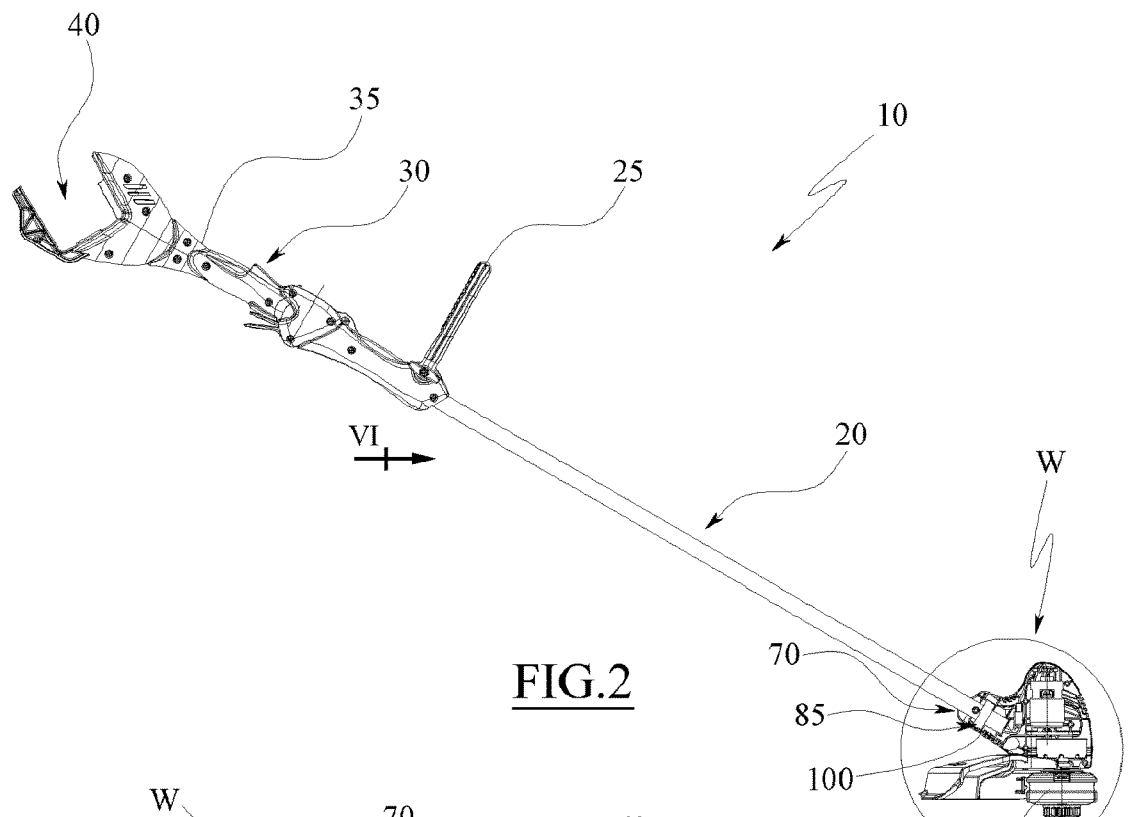
FIG. 2 is a front side view of the work equipment of FIG. 1 with an open casing.

With particular reference to such figures, 10 indicates overall a work equipment, of the electrically powered type, typically a portable work tool, e.g. of the type of those that are commonly used to perform gardening jobs.

In the example illustrated, the work equipment 10 is a brushcutter, i.e. an equipment that is carried in the arms of a user and typically used for cutting grass or hedges.

However, it is not excluded that the aspects of the present description can be applied to other work equipment such as, for example, hedge trimmers or the like.

The work equipment 10 comprises a work apparatus, indicated overall by W, which is placed at one end of a pole 20 of support provided, for example at the opposite end, with a handle 25 and with a grip 30 that allow the user to embrace the work equipment 10.

For example, as in the embodiment illustrated, the handle 25 and the grip 30 are made on a case 35, fixed to the pole 20 at said end thereof, in particular the upper end during the step of using the work equipment 10.

The case 35 then comprises a battery housing 40 adapted to substantially house a power supply battery to measure, and at which appropriate contacts are provided for the electrical connection of the power supply battery with the work apparatus W.

The pole 20 can be adjusted in length and, at the grip 30, it can be provided with a series of commands to control the operation of the operating unit.

For example, said pole 20, has a substantially tubular shape with a round section.

During normal use, the user, in the erect position, grasps the handle 25 and the grip 30, so as to incline the pole 20 downwards and bring the work apparatus W in proximity to the ground.

Figure 3:
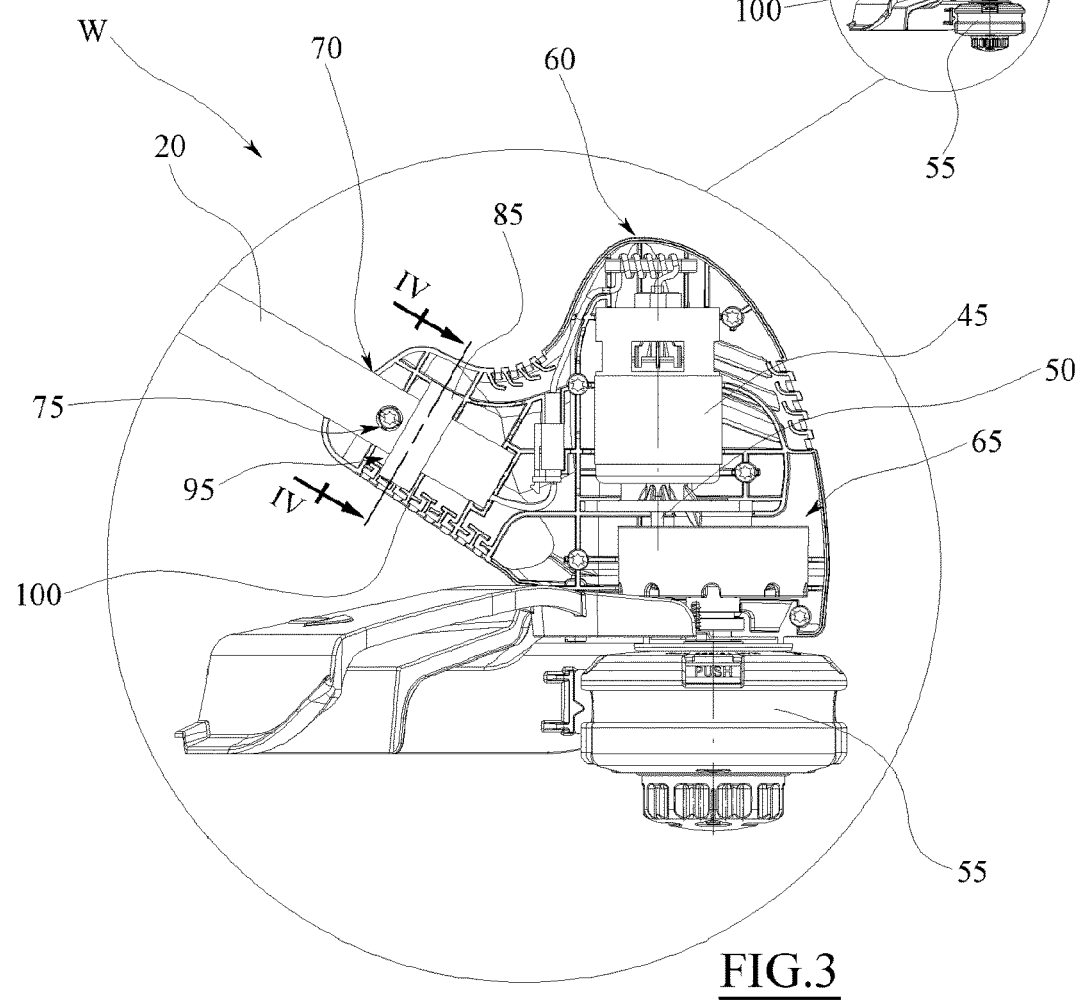
FIG. 3 is an enlarged view of a portion of FIG. 2 in which a work apparatus is illustrated in detail.

As illustrated in FIG. 3, the work apparatus W essentially comprises a motor having a drive shaft 50, and a tool 55 kinematically connected to the drive shaft 50, so as to be able to be activated in movement by the motor itself.

The motor 45 is an electric motor, e.g. a direct current electric motor, which generally comprises a rotor coaxially and solidly fixed to the drive shaft 50 and a stator that surrounds the rotor.

The stator can comprise permanent magnets adapted to generate a fixed magnetic field, whereas the rotor can comprise electrical windings adapted to be crossed by current, so as to generate an induced magnetic field which, by interacting with the fixed magnetic field of the stator, causes the rotation of the rotor, and with it of the drive shaft 50, about an axis of rotation thereof.

The motor 45 is globally contained inside a casing indicated overall with 60.

The casing 60 can be made by two or more shells which are mutually joined together using usual fixing elements, e.g. screws.

In the example illustrated, the two shells are made of plastic material e.g. through an injection moulding process.

The tool 55 is positioned outside the casing 60, e.g. below the motor 45, and can be kinematically connected to the drive shaft 50 so as to be placed in rotation about an axis of rotation which is preferably parallel to the axis of rotation of the drive shaft 50.

For example, the tool 55 may be a cutting tool and may comprise a central body that bears a plurality of flexible cutting wires (not illustrated as known in themselves), which project radially from the central body towards the outside.

For example, the tool 55 can be kinematically connected to the drive shaft 50 through a transmission, indicated overall by 65, which can define a different transmission ratio from 1 between the drive shaft 50 and the tool 55.

For example, the transmission 65 can be adapted to define a speed reduction between the drive shaft 50 and the tool 55.

The transmission 65 can comprise a coaxially toothed pinion firmly fixed to the drive shaft 50, in this case to the portion that projects outside the motor body.

This toothed pinion can be placed to mesh with a toothed wheel, preferably a toothed crown with internal toothing, which can be advantageously positioned in a space that, with respect to the direction defined by the axis of the drive shaft 50, is comprised between the motor body and the tool 55.

The toothed pinion can be made of steel and the toothed wheel can be made of plastic material and preferably with a low coefficient of friction, so as not to require particular lubrication.

The toothed wheel, which may have a larger primitive diameter than that of the toothed pinion, can be in turn coaxially and firmly fixed to an output shaft.

The output shaft can be constrained and rotatably supported inside the casing 60, e.g. by a pair of bearings, so that its axis is parallel to the axis of the drive shaft 50, e.g. coinciding with the axis of rotation of the tool 55.

While the toothed pinion and the toothed wheel are preferably contained within the casing 60, the output shaft can partially project outside the casing 60, so as to be able to be directly hooked to the tool 55.

The tool 55 can be hooked to the projecting portion of the output shaft in a dismountable way, e.g. to allow the replacement thereof in the event of malfunctioning or for other reasons.

The tool 55 can also be partially surrounded by a portion of the casing 60, to protect the user from the grass cuttings or other objects that could be raised and projected backwards by the tool 55 during operation.

The casing 60 is rigidly fixed to the pole 20, i.e. it is fixed to the pole 20 without any residual degrees of freedom, at said end thereof opposite the end in which the handle 25 and grip 30 are arranged, in particular the lower end during the step of using the work equipment 10.

In this way, by moving the pole 20 through the handle 25 and the grip 30, the user can direct the casing 60 and therefore the work apparatus W as a whole.

For example, the casing 60 has a mouth 70 through which the aforementioned end of the pole 20 is inserted, substantially to measure, preferably with friction, so as to project into the casing 60 itself.

In this way, any oscillations of the pole 20 with respect to the casing 60 are prevented. The casing 60 is then rigidly fixed to the pole 20, so as to prevent the extraction of the pole 20 itself through the mouth 70, by means of fixing members 75, e.g. threaded members.

For example, said threaded members comprise a screw inserted in a through slot specifically made in the pole 20, at the end thereof inserted in the casing 60 through the mouth 70, and then screwed into a relevant threaded hole made in the casing 60.

For example, it is possible to envisage that the casing 60 can have an abutment seat adapted to house, substantially to measure, the longitudinal axial end of the pole 20 inserted into the casing 20 through the mouth 70, and that said abutment seat can be equipped with an abutment surface for said longitudinal end of the pole 20.

In this way, when said longitudinal axial end of the pole 20 is in contact with said abutment surface the through slot of the pole 20 is consequently coaxial with the threaded hole made in the casing 60.

In this way, the mutual positioning between the pole 20 and the casing 60 is particularly quick and simple.

The work equipment 10 then comprises a damper element interposed between the casing 60 and the work apparatus W and the pole 20, which is adapted to dampen/absorb the vibrations generated by the work apparatus W and that are transmitted by the casing 60 to the pole 20.

More precisely, the damper element has a surface in direct contact with the pole 20 of support of the work apparatus W and an opposing surface in direct contact with the casing 60.

Preferably, the damper element is interposed between the casing 60 and the pole 20 along the entire circumferential extension of the pole 20.

More precisely, the damper element is interposed between the casing 60 and the pole 20 in a proximal position to the mouth 70 of the casing 60 itself, preferably at a minimum distance from the fixing members 75 of the casing 60 to the pole 20 (meaning the distance between an upper surface of the damper element proximal to the fixing members 75 and a lower surface of the fixing members 75 proximal to the damper element), preferably a distance comprised between 5 mm and 25 mm, e.g. a distance of 7 mm.

In practice, the damper element is preferably interposed between the pole 20 and the casing 60 of the work apparatus W, at the connection point and rigid fixing of the two, as it is in this zone that the transmission 65 of the vibrations to the pole 20, and therefore to the user of the work equipment 10, mainly takes place.

In the embodiment illustrated, the damper element comprises an annular body 85 fitted onto the pole 20 for supporting the work apparatus W, i.e. adapted to circumferentially embrace the pole 20 itself.

More precisely, the annular body 85 is provided with an inner (cylindrical) surface facing towards the pole 20, and in direct contact therewith, and an opposing outer (cylindrical) surface facing towards the casing 60 and in direct contact therewith.

For example, the annular body 85 can further have a lower surface and an opposing upper surface, connecting the inner surface and the outer surface, which are substantially planar.

However, it is not excluded that in alternative embodiments, the annular body 85 may have a convex lower surface and/or upper surface.

Figure 4:
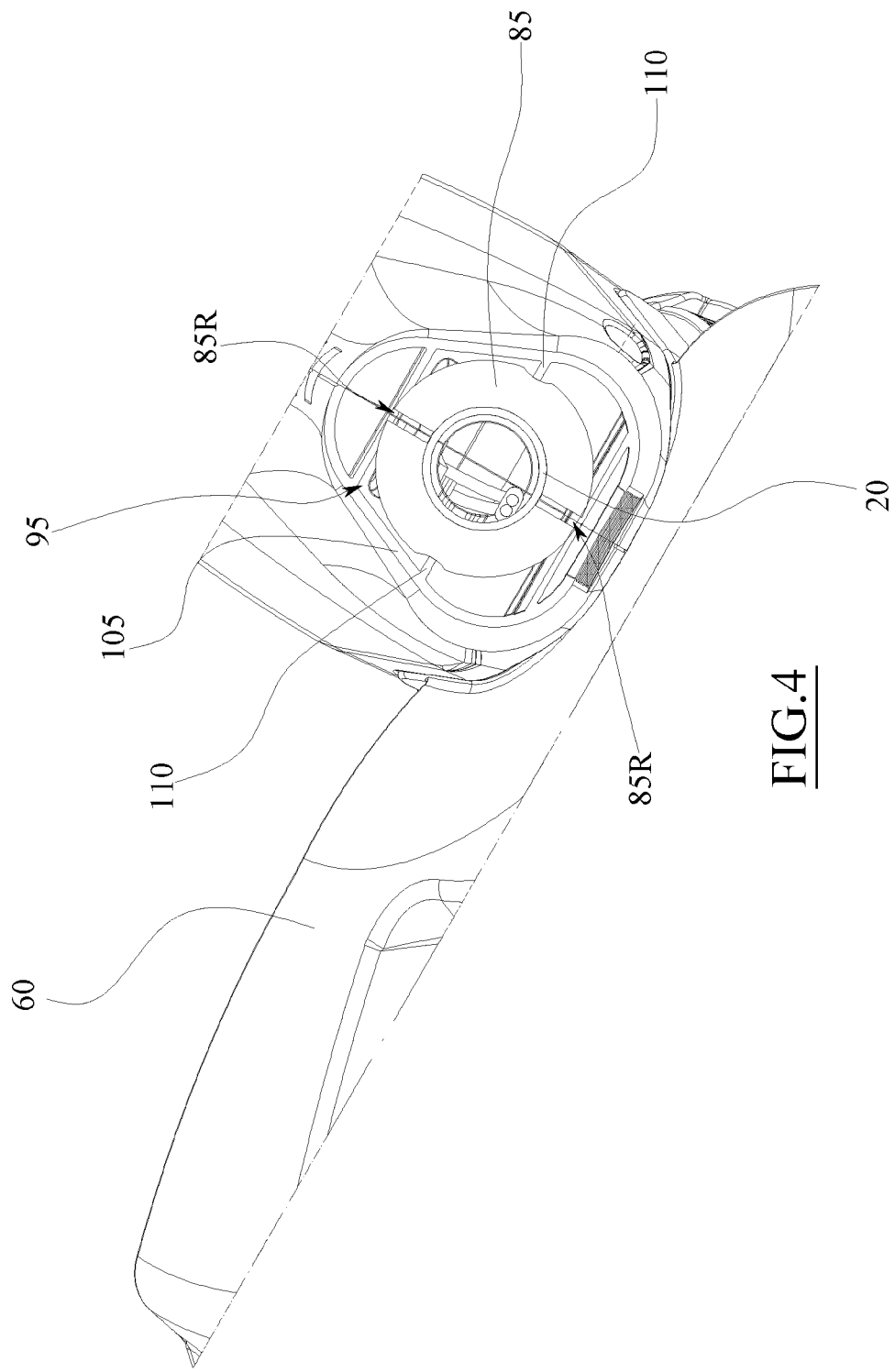
FIG. 4 is a sectional view of FIG. 3 along the plane of section IV-IV.

As can be seen in FIG. 4, the annular body 85 may be made of two half portions arranged symmetrically with respect to a longitudinal median plane of the pole 20, each adapted to embrace a respective circumferential portion of the pole 20.

In that case, the annular body 85 can have two completely through radial openings 85R, i.e. both the ends of the two half portions in which the annular body 85 is made are mutually facing each other in an aligned way and close to each other in distance, i.e. said ends of the two half portions are not joined and a passage opening towards the pole 20 remains defined.

It is not excluded that in other embodiments the annular body 85 may be made of a single piece, and that it may have a completely through radial opening, so as to allow the annular body to be enlarged during the step of insertion onto the pole 20 before being elastically closed to firmly embrace the pole 20 itself once in position.

It is not excluded, furthermore, that the annular body 85 may be made of a single piece, be provided with completely through radial openings, and that it may have an inner diameter such as to be able to be fitted/threaded to measure with reduced friction onto the pole 20 so as to firmly embrace it.

In any case, the annular body 85 is completely interposed between the pole 20 and the casing 60, i.e. also in the event in which the annular body 85 has said radial openings 85R there is no direct contact between the pole 20 and the casing 60 through the radial openings themselves.

Preferably, the annular body 85 has a thickness, meaning the difference between the inner diameter and the outer diameter of the annular body, comprised between 5 mm and 15 mm, e.g. the annular body 85 has a thickness of 9 mm.

Furthermore, the annular body 85 may have a height, meaning the difference between the lower surface and the upper surface thereof, comprised between 10 mm and 20 mm, e.g. the annular body 85 has a height of 14 mm.

It is not excluded that in alternative embodiments of the invention, the damper element 85 may comprise various annular bodies interposed between the pole 20 and the casing 60, each fitted onto the pole 20 in a different position along the longitudinal extension of the pole 20 itself.

It is further not excluded that the damper element 85 may comprise one or more bodies, e.g. of different shapes with respect to the one illustrated, and that each of said bodies may be made in one or more portions.

Said damper element, i.e. the annular body 85, is made of a yielding material, e.g. it is made of NBR, an acronym for nitrile butadiene rubber, i.e. the damper element is made of a copolymer of acrylonitrile and butadiene, however it is not excluded that in alternative embodiments it may be made of another yielding material which is however suitable for the purpose.

Preferably, the damper element is interposed between the pole 20 and the casing 60 and can be at least partially inserted in a seat specifically made in the casing 60 itself.

In the example, as the casing 60 is made of two shells then joined by means of fixing members, the seat of the damper element is also made of two portions, each associated with a respective shell, adapted to face and flank each other so as to define said seat for the damper element.

Furthermore, said seat may have abutment teeth 110 adapted to contact the damper element and placed in pressure thereon.

In the embodiment illustrated, as can be seen better in FIG. 4, the annular body 85 of the damper element is inserted, at least partially and substantially to measure, preferably with pressure, inside a seat 95 made in the casing 60.

In particular, said seat 95 has a bottom wall 100 defining a lower abutment surface for the damper element, i.e. for the lower surface of the annular body 85, and a side wall 105, adapted to be placed in contact with the damper element, and in particular with the outer surface of the annular body 85.

From the side wall 105, towards the pole 20, abutment teeth 110 extend radially adapted to contact said outer surface of the annular body 85 and placed in pressure thereon, through which the side wall 105 is placed in contact with the damper element. Said teeth 110 are rigid and for example made of plastic.

In particular, said teeth 110 have an end constrained to the side wall 105 of the seat 95 made in the casing 60 and an opposing free end placed in pressurized contact against the damper element.

For example, said teeth 110 are made in a joint body with the casing 60, i.e. they are directly obtained during the process of making the casing 60.

Preferably, the teeth 110 have at their free end, in pressurized contact with the damper element, a rounded profile or however a profile without sharp edges.

This prevents a possible laceration effect of the damper element, i.e. of the annular body 85.

In practice, said teeth 110 are pressed against the damper element, and in particular against said outer surface of the annular body 85, so as to (elastically) deform it locally and reversibly.

In this way, the damper element is held firmly in position, and the direct connection between the damper element and the casing 60 is improved, and at the same time the vibration damping/absorption effect is notably increased.

Preferably, the teeth 110 made in the seat 95 are arranged symmetrically with respect to a longitudinal median plane of the pole 20, i.e. they are adapted to contact and press against the damper element, i.e. on the outer surface of the annular body 85, so as to exert pressure at opposing parts of the damper element itself.

This allows a particularly balanced solution to be made, from the point of view of forces acting on the damper element.

The invention thus conceived is susceptible to several modifications and variations, all falling within the scope of the inventive concept.

Moreover, all the details can be replaced by other technically equivalent elements.

In practice, the materials used, as well as the contingent shapes and sizes, can be whatever according to the requirements without for this reason departing from the scope of protection of the following claims.

The invention claimed is:

1. A work equipment (10) comprising a pole (20) for supporting a work apparatus (W), wherein the work apparatus (W) is placed at one end of the pole and the work apparatus (W) comprises:
   a casing (60) rigidly fixed to said one end of the pole (20),
   a work tool (55) disposed near said one end of the pole (20), and
   a motor (45) contained inside the casing (60) and adapted to activate the work tool (55),
   wherein the work equipment (10) further comprises a damper element interposed between the casing (60) and the pole (20) to dampen/absorb vibrations transmitted by the casing (60) to the pole (20),
   wherein the damper element comprises an annular body fitted onto the pole (20), the annular body (85) having an inner cylindrical surface facing towards the pole (20) and in direct contact therewith and an opposing outer cylindrical surface facing towards the casing (60) and in direct contact therewith, the annular body having two completely through radial openings (85R) extending from the inner cylindrical surface to the outer cylindrical surface, the two completely through radial openings (85R) separating the annular body (85) into two separated half portions arranged symmetrically with respect to a longitudinal median plane of the pole (20), each of which embraces a respective circumferential portion of the pole (20), each one of the two half portions comprising a first end facing the first end of the other one of the two half portions and distanced thereto so as to define a first passage opening therebetween, each one of the two half portions further comprising a second end facing the second end of the other one of the two half portions and distanced thereto so as to define a second passage opening therebetween, the first and the second passage openings being the two completely through radial openings (85R).

2. The work equipment (10) according to claim 1, wherein the damper element (85) is interposed between the casing (60) and the pole (20) along an entire circumferential extension of the pole (20).

3. The work equipment (10) according to claim 1, wherein the damper element (85) is housed in a seat (95) made in the casing (60) of the work apparatus (W).

4. The work equipment (10) according to claim 1, wherein the casing (60) of the work apparatus (W) has abutment teeth (110), placed in pressure against the damper element (85).

5. The work equipment (10) according to claim 1, wherein the casing (60) comprises two shells fixed to each other by fixing elements.

6. The work equipment (10) according to claim 1, wherein the damper element (85) is made of a copolymer of acrylonitrile and butadiene.

7. The work equipment (10) according to claim 1, further comprising a handle (25) and a grip (30) provided at an opposite end of the pole (2) with respect to said one end where the work apparatus (W) is placed.

8. The work equipment (10) according to claim 7, wherein the handle (25) and the grip (30) are made on a case (35) fixed at said opposite end of the pole (2), said case (35) comprising a battery housing (40) adapted to house a power supply battery and being provided with contacts for an electrical connection of the power supply battery with the work apparatus (W).

9. The work equipment (10) according to claim 1, wherein the work tool (55) is kinematically connected to a drive shaft (50) of the motor (45) through a transmission (65).

10. The work equipment (10) according to claim 9, wherein the transmission (65) is a gearing.

11. The work equipment (10) according to claim 9, wherein the transmission (65) is contained within said casing (60).

12. The work equipment (10) according to claim 9, wherein the work tool (55) has an axis of rotation parallel to an axis of the drive shaft (50).

13. The work equipment (10) according to claim 1, wherein the work tool (55) is partly surrounded by a portion of the casing (60).

14. A work equipment (10) comprising a pole (20) for supporting a work apparatus (W), wherein the work apparatus (W) is placed at one end of the pole and the work apparatus (W) comprises:
   a casing (60) rigidly fixed to said one end of the pole (20),
   a work tool (55) disposed near said one end of the pole (20), and
   a motor (45) contained inside the casing (60) and adapted to activate the work tool (55),
   wherein the work equipment (10) further comprises a damper element (85) interposed between the casing (60) and the pole (20) to dampen/absorb vibrations transmitted by the casing (60) to the pole (20),
   wherein the damper element comprises an annular body fitted onto the pole (20), said annular body (85) having an inner cylindrical surface facing towards the pole (20) and in direct contact therewith and an opposing outer cylindrical surface facing towards the casing (60) and in direct contact therewith, the annular body (85) being made of a single piece and having a completely through radial opening extending from the inner surface to the outer surface, which is configured to allow the annular body to be enlarged during insertion onto the pole (20) before being elastically closed to firmly embrace the pole (20) once in position.

* * * * *